US010210976B2

(12) United States Patent
Katayama et al.

(10) Patent No.: US 10,210,976 B2
(45) Date of Patent: Feb. 19, 2019

(54) MAGNETIC CASING CLAMPING SYSTEM

(71) Applicant: Schlumberger Technology Corporation, Sugar Land, TX (US)

(72) Inventors: Makito Katayama, Yamato (JP); Takashi Yoshikawa, Machida (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/364,338

(22) Filed: Nov. 30, 2016

(65) Prior Publication Data

US 2017/0154714 A1 Jun. 1, 2017

Related U.S. Application Data

(60) Provisional application No. 62/261,259, filed on Nov. 30, 2015.

(51) Int. Cl.
*H01F 7/00* (2006.01)
*H01F 7/04* (2006.01)
*H01F 7/16* (2006.01)
*G01V 1/16* (2006.01)
*E21B 23/01* (2006.01)
*E21B 47/01* (2012.01)
*G01V 1/42* (2006.01)
*H01F 7/13* (2006.01)
*G01V 1/52* (2006.01)

(52) U.S. Cl.
CPC .............. *H01F 7/04* (2013.01); *E21B 23/01* (2013.01); *E21B 47/01* (2013.01); *G01V 1/162* (2013.01); *G01V 1/42* (2013.01); *G01V 1/52* (2013.01); *H01F 7/13* (2013.01); *H01F 7/1646* (2013.01); *G01V 2001/526* (2013.01)

(58) Field of Classification Search
CPC ................................................ H01F 2007/1669
USPC ......................................................... 335/234
See application file for complete search history.

(56) References Cited

U.S. PATENT DOCUMENTS

| | | | | |
|---|---|---|---|---|
| 4,715,470 A | * | 12/1987 | Paulsson ................. | E21B 23/01 181/106 |
| 4,829,947 A | * | 5/1989 | Lequesne ................. | F01L 9/04 123/90.11 |
| 4,953,136 A | * | 8/1990 | Kamata .................... | G01V 1/16 181/102 |
| 6,047,672 A | * | 4/2000 | Hanai ....................... | F01L 9/04 123/90.11 |
| 6,057,750 A | * | 5/2000 | Sheng .................... | H01F 7/1615 335/229 |

(Continued)

*Primary Examiner* — Alexander Talpalatski
(74) *Attorney, Agent, or Firm* — Eileen Pape

(57) ABSTRACT

A downhole magnetic clamping system for a tool is provided. The clamping system may include a first permanent magnet, and a yoke, movably positioned next to the first permanent magnet and movable to at least two positions, a first position in which a magnetic attraction force produced by the first permanent magnet on structures exterior to the tool is reduced relative to a second position. In addition, the clamping system may further include a non-linear resilient member applying a resilient force to the yoke in the direction of the second position. Further, the clamping system may include an electro-magnetic coil, operable in a first and second direction to initiate movement of the yoke between the first position and the second position.

19 Claims, 2 Drawing Sheets

(56) References Cited

U.S. PATENT DOCUMENTS

| | | | | |
|---|---|---|---|---|
| 6,176,208 B1* | 1/2001 | Tsuzuki | ............... | F01L 1/462 |
| | | | | 123/90.11 |
| 6,831,535 B1* | 12/2004 | Wen | ............... | H01H 51/2209 |
| | | | | 335/132 |
| 6,885,308 B2* | 4/2005 | Smith | ............... | E21B 47/011 |
| | | | | 324/339 |
| 6,896,236 B2* | 5/2005 | Wang | ............... | F01L 9/04 |
| | | | | 123/90.11 |
| 7,012,852 B2* | 3/2006 | West | ............... | G01V 11/00 |
| | | | | 166/250.16 |
| 8,215,610 B2* | 7/2012 | Shiao | ............... | F16K 31/082 |
| | | | | 251/129.16 |
| 8,701,481 B2* | 4/2014 | Andersen | ............... | E21B 17/1021 |
| | | | | 73/152.54 |
| 2007/0165487 A1 | 7/2007 | Nutt et al. | | |
| 2009/0159823 A1* | 6/2009 | Matsunaga | ............... | F16K 11/07 |
| | | | | 251/129.15 |
| 2010/0044607 A1* | 2/2010 | Miki | ............... | F16K 3/06 |
| | | | | 251/129.11 |
| 2013/0333872 A1 | 12/2013 | McMillon et al. | | |
| 2014/0238669 A1 | 8/2014 | Odashima et al. | | |

* cited by examiner

"OFF"

"ON"

MAGNETIC CASING CLAMPING SYSTEM

RELATED APPLICATIONS

This application claims the benefit of a related U.S. Provisional Application Ser. No. 62/261,259, filed Nov. 30, 2015, entitled "Magnetic Casing Clamping System," to Makito KATAYAMA et al., the disclosure of which is incorporated by reference herein in its entirety.

BACKGROUND

The following descriptions and examples are not admitted to be prior art by virtue of their inclusion in this section.

Hydrocarbon fluids such as oil and natural gas are obtained from a subterranean geologic formation, referred to as a reservoir, by drilling a well that penetrates the hydrocarbon-bearing formation. When evaluating various subterranean features in fields containing hydrocarbon fluids, downhole operations such as seismic measurement are often used. Currently, a modern business trend is to have as many sensor modules as possible mounted onto an array cable, because relatively high numbers of sensor module recordings contribute to minimal operation time and providing higher quality data. For example, one company Sercel Inc. produces downhole seismic array tools which have more than 100 receiver modules included with an array structure.

In order to efficiently add many receiver modules for one array, reliable, small, and cheap systems are needed for facilitation. Accordingly, it is important to simplify any of the component's mechanical structures. When considering seismic tools, clamping the sensor package onto the casing is a beneficial process used in order to detect the dynamic motion of the formation. However, the mechanical structure of current clamping systems tend to be complicated and inefficient in their ability to produce an on/off clamping force, often via a mechanical arm pushing the sensor package against the casing, or via a magnetic force using a motor and a yoke assembly.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the claimed disclosure may comprise a downhole magnetic clamping system for a tool. The clamping system may include a first permanent magnet, and a yoke, movably positioned next to the first permanent magnet and movable to at least two positions, a first position in which a magnetic attraction force produced by the first permanent magnet on structures exterior to the tool is reduced relative to a second position. In addition, the clamping system may further include a non-linear resilient member applying a resilient force to the yoke in the direction of the second position. Further, the clamping system may include an electro-magnetic coil, operable in a first and second direction to initiate movement of the yoke between the first position and the second position.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or in modules that are deployed for the purposes of sensing data relating to the environmental and tool parameters downhole, within a borehole. The tools and sensing systems disclosed herein may effectively sense and store characteristics relating to components of downhole tools as well as formation parameters at elevated temperatures and pressures.

The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Embodiments of the proposed clamping system incorporate the use of a magnet and a yoke to control the magnetic force emanating from the magnet. The theory may be described as part of a seismic sensing array with a plurality of sensor packages, but any sensing or measuring device incorporating clamping may include aspects of the present disclosure and are considered within the scope of this application.

Figure 1A:
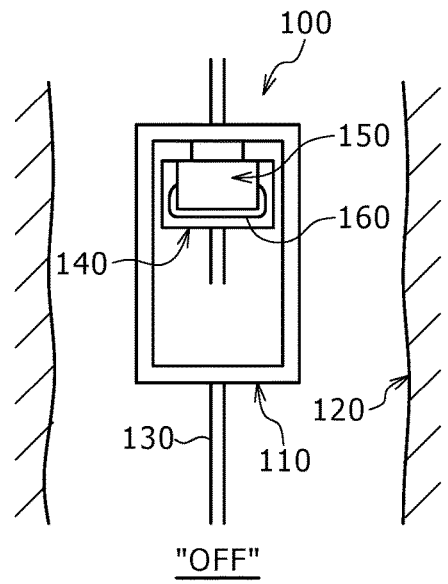
FIGS. 1A and 1B are schematic illustrations of a prior art magnetic clamp using a yoke.
Figure 1B:
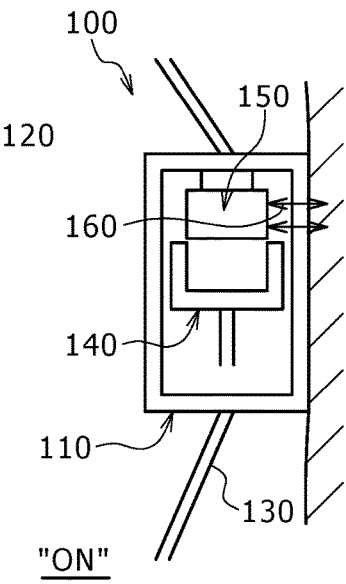

Referring generally to the exemplary FIGS. 1A and 1B, this schematic illustrates a basic concept behind a magnet and yoke clamping system. As seen in the left side of the figure, a permanent magnet 150 is fixed in position relative to the housing 110 of a sensor package 100. A metallic yoke 140 is configured and positioned so as to fully cover the sides and one surface of the magnet 150. The sensor package 100 is suspended by means of a cable 130 that is attached to two ends of the housing 110. Although not illustrated in this figure, the portion of the sensor package and cable shown may represent one of a plurality of sensor packages attached to one another through the use of a cable.

When the sensor package 100 is deployed downhole, there is little need to clamp the sensor package to the casing 120 lining a wellbore. In fact, if the magnet 150 were to exert a strong attractive force towards the casing 120, the sensor array may require weight or a tractor to fully deploy downhole. But with a permanent magnet 150, the magnetic force 160 is constantly generated, and use of an electro-magnet for clamping force would require additional components and the expenditure of large amounts of energy, either from an internal battery or from the cable. In order to control or reduce the level of magnetic attraction produced by the permanent magnet 150 during deployment, a metallic yoke 140 is positioned to couple with the magnet 150, in some cases, the opposing surfaces may be designed to contact one another.

When the yoke 140 is surrounding the sides of the permanent magnet 150 and abutting the surface of the permanent magnet 150, the magnetic field 160 is constrained by the yoke 140 to flow around the magnet 150, as seen in the figure. By providing a pathway for the magnetic field 160, the attraction force between the magnet 150 and the casing 120 is reduced, allowing for ease of travel of the sensor package 100 and array during deployment.

Referring generally to the right side of the figure, the yoke 140 is moved apart from the permanent magnet 150, allowing the magnetic force 160 to emanate from the permanent magnet 150 and apply a clamping force against an inner surface of the casing 120. The magnetic force 160 can be illustrated as indicated by the arrows in the figure. When the yoke 140 is displaced from the permanent magnet 150, the clamping system is 'on'. When the yoke 140 is coupled or attached to the permanent magnet 150, the clamping system is 'off'.

Figure 2:
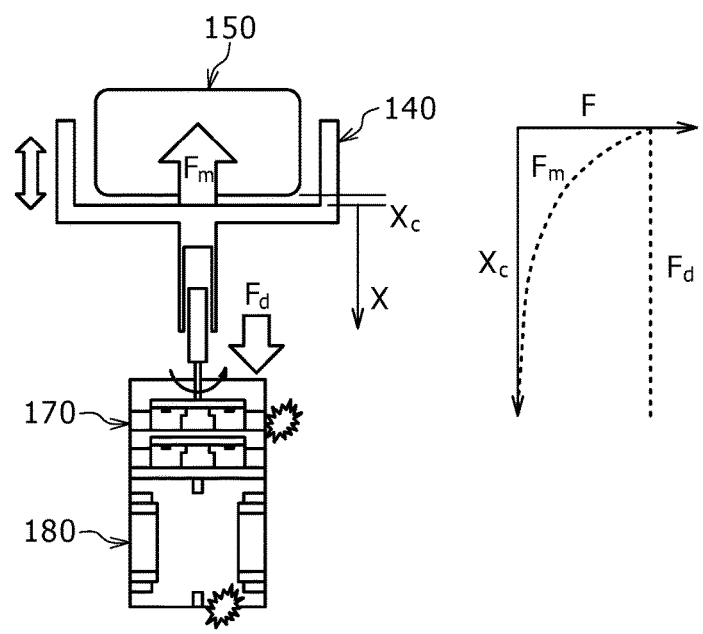
FIG. 2 is a schematic illustration of prior art magnetic clamping using a motor and graphs showing various forces on the yoke.

Turning now to prior art FIG. 2. Conventional implementations of a permanent magnet 150 and yoke 140 system use a motor 180 and a threaded attachment to the yoke. As seen in this figure, a gear box 170 takes an input from the motor 180 and uses a threaded connection to apply a force $F_d$ to the yoke 140. When the $F_d$ exceeds the force of the permanent magnet $F_m$, the yoke 140 moves apart from the magnet 150 and the clamping system is switched 'on' as previously explained.

However, with this system and as shown by the graph on the right side of the figure, $F_d$, as generated by the motor 180 and the threaded gear box assembly 170, is relatively constant. But $F_m$ from the permanent magnet 150 is greatest when the yoke 140 is contacting the magnet 150 and then falls exponentially as the yoke 140 moves away from the magnet 150. The result is that the application of the force $F_d$ from the motor 180 is significantly inefficient relative to the travel position of the yoke 140. While a relatively strong motor 180 is need to initially break the contact between the yoke 140 and the permanent magnet 150, the strength required rapidly diminishes as the yoke 140 gains in distance away from the magnet 150. At the end of the travel, the difference between the two levels of force is quite large.

Figure 3:
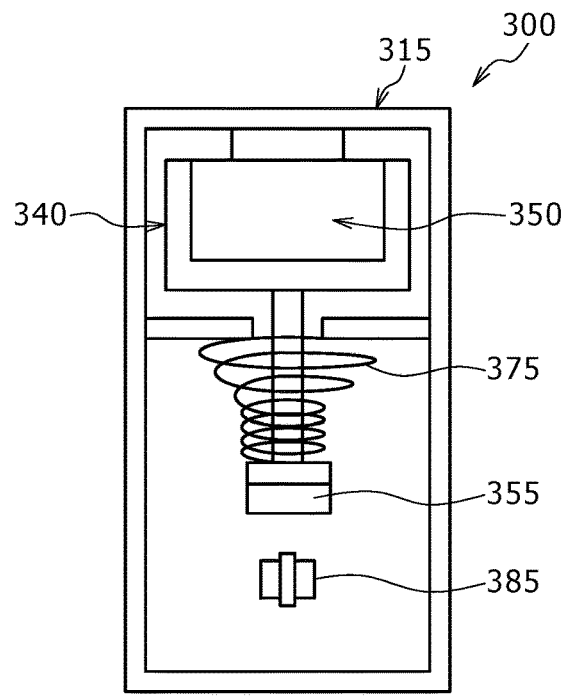
FIG. 3 is a schematic illustration of magnetic clamping using a solenoid coil, according to an embodiment of the disclosure.

Embodiments of the current disclosure have attempted to increase the efficiency of moving a yoke between an 'on' and 'off' position. As seen in exemplary FIG. 3, embodiments of a sensor package 300 may include a housing 315. Within the housing 315 is a yoke 340 surrounding and in some cases contacting at least one surface of a permanent magnet 350. The permanent magnet 350 may be fixed in position relative to the housing 315.

Applying a force to the yoke 340 and away from the permanent magnet 350 is a non-linear spring 375. The non-linear spring 375 may have an incremental increase in spring constant or may be composed of two or more sections of relatively constant but greater spring constants. Attached to the other end of the yoke 340 is another permanent magnet 355 that is configured to move along with the yoke 340. The other permanent magnet 355 may be attracted by an electro-magnetic coil 385, fixed in position relative to the housing 315. Although another permanent magnet 355 and an electro-magnetic coil 385 have been shown, these components may be replaced with functional or other types of equivalent components performing the same general functions.

Figure 4:
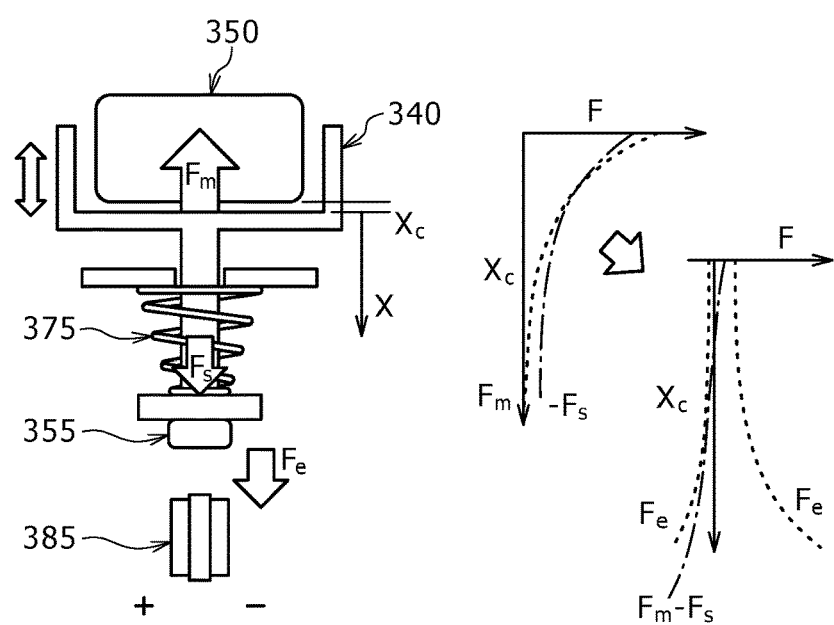
FIG. 4 is a schematic illustration of magnetic clamping using a solenoid coil and graphs showing various forces on the yoke, according to an embodiment of the disclosure.

Now generally referring to FIG. 4, this exemplary figure shows an embodiment of the clamping system along with the forces acting on the yoke 340 generated by the various components. The forces are also shown in two graphs on the right side of the figure. The primary forces include the force of the permanent magnet $F_m$ being opposed by the force of the non-linear spring $F_s$. The first graph shows the interaction of these two forces. When $X_c$ (displacement of the yoke 340 from the permanent magnet 350) is zero, the force of the permanent magnet $F_m$ exceeds the force of the linear spring $F_s$ and the yoke 340 is coupled to the magnet 350 and the clamping system is 'off'.

At the other end of the travel of the yoke 340, when $X_c$ is at its largest value, the force of the spring $F_s$ exceeds the force of the magnet $F_m$ and the yoke 340 remains in the 'on' position. As shown in the first graph, the two forces are much more closely aligned to one another, so that the system is not significantly over or under specified during the entire length of travel of the yoke 340. The slight difference at either end of travel allow the system to stably remain in an 'on' or 'off' position. Therefore, only a small force is required to initiate the travel of the yoke 340 in either direction.

As seen in this exemplary embodiment, the small force required to initiate the travel of the yoke 340 is produced by an electro-magnetic coil 385 that can be operated in two directions by changing the polarity of an applied current. When operated in the direction as shown, the electro-magnetic coil produces a force $F_e$ in the same direction as the $F_s$. This force is enough to exceed the difference between the magnetic force $F_m$ and the non-linear spring force $F_s$. In reverse, when the yoke 340 is moving from the 'on' position to the 'off' position, the electro-magnetic $F_e$ provides a slight push (in the direction of the magnetic force $F_m$). The electro-magnetic force $F_e$ is able to overcome the spring force to start the motion of the yoke 340 so that the clamping system is switched 'off'.

Turning to the second graph, the difference between the magnetic force $F_m$ and the non-linear spring force $F_s$ is shown as essentially a straight line. This is due in part to the incremental nature of the spring force $F_s$ being selected to correspond to the drop off in the magnetic force $F_m$. The difference between the forces is shown located between the application of the electro-magnetic coil force $F_e$ in both a positive (e.g., above the axis) and reverse polarity (e.g., below the axis) direction. In one direction, a higher current may be applied to the electro-magnetic coil than the other direction. Another permanent magnet 355 applied to one end of the yoke 340 to enhance the effect from the electro-magnetic coil 385. The other permanent magnet 355 may be sized so as to optimize the specification of the elecro-magnetic coil 385 and the power requirements of the electro-magnetic coil 385.

Referring to the far right side graph shown in FIG. 4, the far right side graph shows the application of the electro-magnetic coil 385 adding a force $F_e$ to the difference between the force from the permanent magnet 350 and the non-linear spring 375, $F_m$-$F_s$, to initiate the movement of the yoke 340 from the 'off' position to the 'on' position. The electro-magnetic coil 385 only needs to be applied until the force from the non-linear spring $F_s$ begins to exceed the force from the permanent magnet $F_m$. After which, the yoke 340 will continue to travel on its own until it reaches the 'on' position at the highest value of distance $X_c$. For reverse operation, the polarity is switched at the electro-magnetic coil 385 and a smaller current is applied to begin the movement of the yoke 340 from the 'on' position to the 'off' position.

The use of a non-linear spring 375 reduces the overall force required to induce motion in the yoke 340. Although embodiments of the current disclosure show the combination of a non-linear spring 340 with an electro-magnetic coil 385, other mechanisms may be used to initiate motion in the yoke 340. As previously stated, although a non-linear spring 375 with an incremental spring constant may be one of the more optimized methods of creating embodiments of this disclosure, springs with step increases in spring constant may be considered within the scope of the disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A downhole magnetic clamping system for a tool, the system comprising:
   a first permanent magnet to apply a magnetic clamping force to a casing;
   a yoke, translatable between a first position in which the magnetic clamping force is inhibited, and a second position in which the magnetic clamping force is uninhibited, wherein the yoke surrounds the first permanent magnet on two or more sides when in the first position and is configured to provide a pathway for the magnetic clamping force;
   a non-linear resilient member applying a resilient force to the yoke in a direction of the second position;
   a second permanent magnet fixedly coupled to the yoke and exerting a second magnetic force along a direction of movement of the yoke, the non-linear resilient member interposed between the first permanent magnet and the second permanent magnet; and
   an electro-magnetic coil, operable in a first and second polarity to produce an electro-magnetic force used to initiate movement of the yoke between the first position and the second position.

2. The downhole magnetic clamping system of claim 1, wherein the non-linear resilient member is a spring with an incremental spring constant.

3. The downhole magnetic clamping system of claim 1, wherein a voltage applied to the electro-magnetic coil is reversed to change between the first polarity and the second polarity.

4. The downhole magnetic clamping system of claim 1, wherein the first polarity applied to the electro-magnetic coil is used to initiate movement of the yoke at the first position, and the second polarity is used to initiate movement of the yoke at the second position.

5. The downhole magnetic clamping system of claim 1, wherein the second magnetic force attracts the yoke to the electro-magnetic coil when the electro-magnetic coil is subjected to the first polarity and repels the yoke from the electro-magnetic coil when the electro-magnetic coil is subjected to the second polarity.

6. The downhole magnetic clamping system of claim 1, wherein the clamping system is part of a seismic sensing system.

7. The downhole magnetic clamping system of claim 1, wherein the clamping system is part of a wireline tool.

8. An acoustic wireline tool comprising:
   a cable connected to a housing:
   wherein the housing comprises:
      a first permanent magnet fixed with respect to position relative to the housing and configured to apply a magnetic clamping force to a casing;
      a yoke, translatable with respect to position relative to the housing between a first position in which the magnetic clamping force is inhibited, and a second position in which the magnetic clamping force is uninhibited, the yoke to surround at least two sides of the first permanent magnet when the yoke is in the first position;
      a non-linear resilient member applying a resilient force to the yoke in a direction of the second position;
      a second permanent magnet fixedly coupled to the yoke and exerting a second magnetic force along a direction of movement of the yoke, the non-linear resilient member interposed between the first permanent magnet and the second permanent magnet; and
      an electro-magnetic coil, operable in a first and second polarity to produce an electro-magnetic force used to initiate movement of the yoke between the first position and the second position.

9. The acoustic wireline tool of claim 8, wherein the wireline tool is deployed with the yoke in the first position and clamped to the casing when the yoke is in the second position.

10. The acoustic wireline tool of claim 8, wherein the housing is made of a magnetically permeable material.

11. The acoustic wireline tool of claim 8, wherein the first polarity applied to the electro-magnetic coil is used to initiate movement of the yoke at the first position, and the second polarity is used to initiate movement of the yoke at the second position.

12. A sensing system for measuring acoustic signals comprising:
    a housing comprising:
        a first permanent magnet fixed with respect to position relative to the housing and configured to apply a first magnetic clamping force to a casing;
        a yoke, translatable with respect to position relative to the housing between a first position in which the magnetic clamping force is inhibited, and a second position in which the magnetic clamping force is uninhibited;
        a non-linear resilient member applying a resilient force to the yoke in a direction of the second position;
        a second permanent magnet fixedly coupled to the yoke and exerting a second magnetic force along the direction of movement of the yoke, the non-linear resilient member interposed between the first permanent magnet and the second permanent magnet; and
        an electro-magnetic coil, operable in a first and second polarity to produce an electro-magnetic force working in cooperation with the second magnetic force to initiate movement of the yoke between the first position and the second position.

13. The sensing system of claim 12, wherein the non-linear resilient member is a spring with an incremental spring constant.

14. The sensing system of claim 12, wherein a voltage applied to the electro-magnetic coil is reversed to change between the first and the second polarity.

15. The sensing system of claim 12, wherein the first polarity applied to the electro-magnetic coil is used to initiate movement of the yoke at the first position, and the second polarity is used to initiate movement of the yoke at the second position.

16. The sensing system of claim 12, wherein the second magnetic force attracts the yoke to the electro-magnetic coil when the electro-magnetic coil is subjected to the first polarity and repels the yoke from the electro-magnetic coil when the electro-magnetic coil is subjected to the second polarity.

17. A sensing system for measuring acoustic signals, the system comprising:
    a first permanent magnet fixed with respect to position relative to the housing and configured to apply a first magnetic clamping force to a casing;
    a yoke, translatable with respect to position relative to the housing between a first position in which the magnetic clamping force is inhibited, and a second position in which the magnetic clamping force is uninhibited, wherein the yoke surrounds the permanent magnet on two or more sides when in the first position and is configured to provide a pathway for the magnetic clamping force;
    a non-linear resilient member applying a resilient force to the yoke in a direction of the second position;
    a second permanent magnet fixedly coupled to the yoke and exerting a second magnetic force along the direction of movement of the yoke, the non-linear resilient member interposed between the first permanent magnet and the second permanent magnet; and
    an electro-magnetic coil, operable in a first and second polarity to produce an electro-magnetic force working in cooperation with the second magnetic force to initiate movement of the yoke between the first position and the second position.

18. The downhole magnetic clamping system of claim 1, wherein the non-linear resilient member and the second permanent magnet are disposed along a longitudinal axis extending through the yoke.

19. The downhole magnetic clamping system of claim 18, wherein the second permanent magnet is coupled to an end of a stem of the yoke proximate to the electro-magnetic coil.

* * * * *